Patented Aug. 6, 1929.

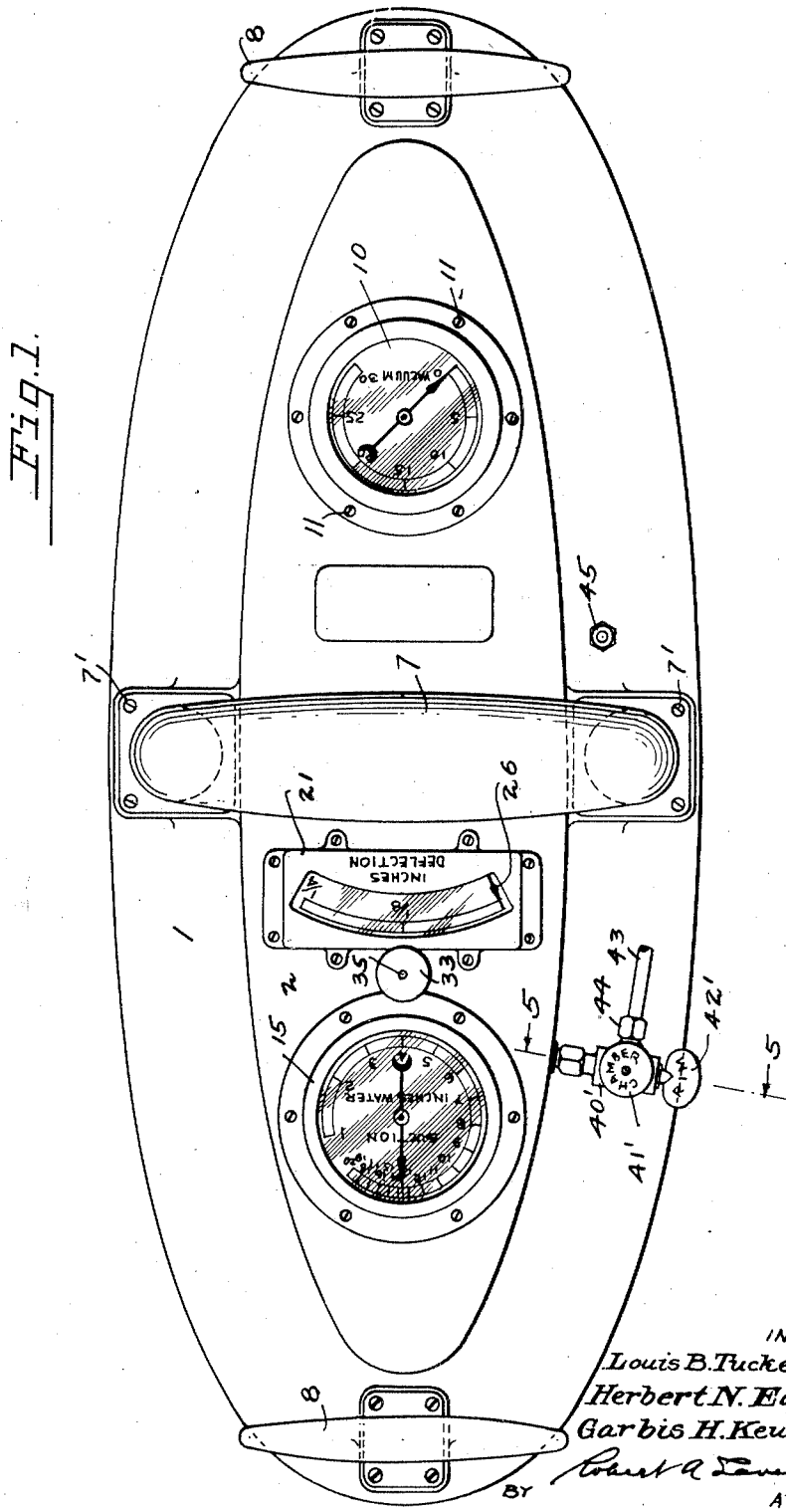

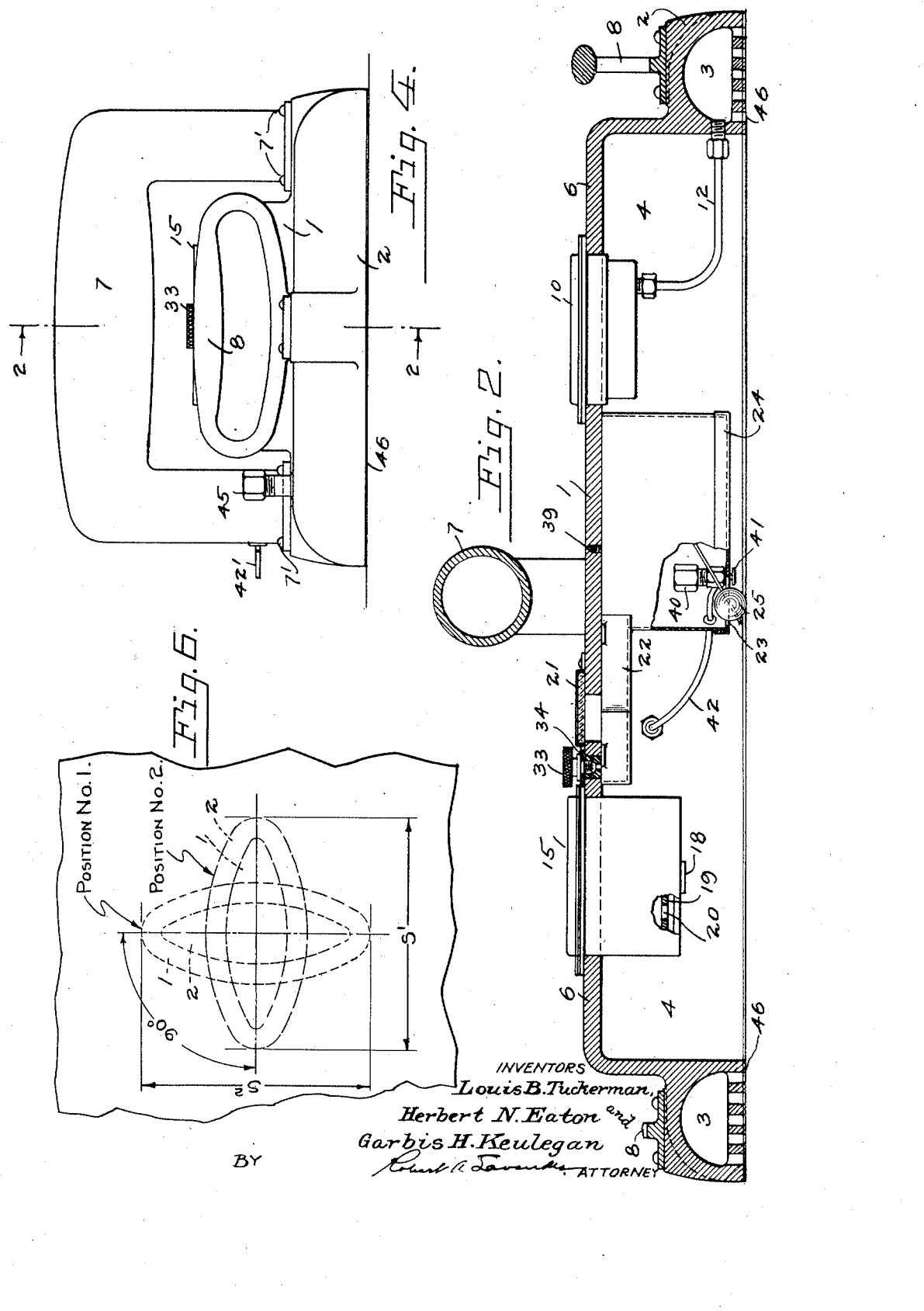

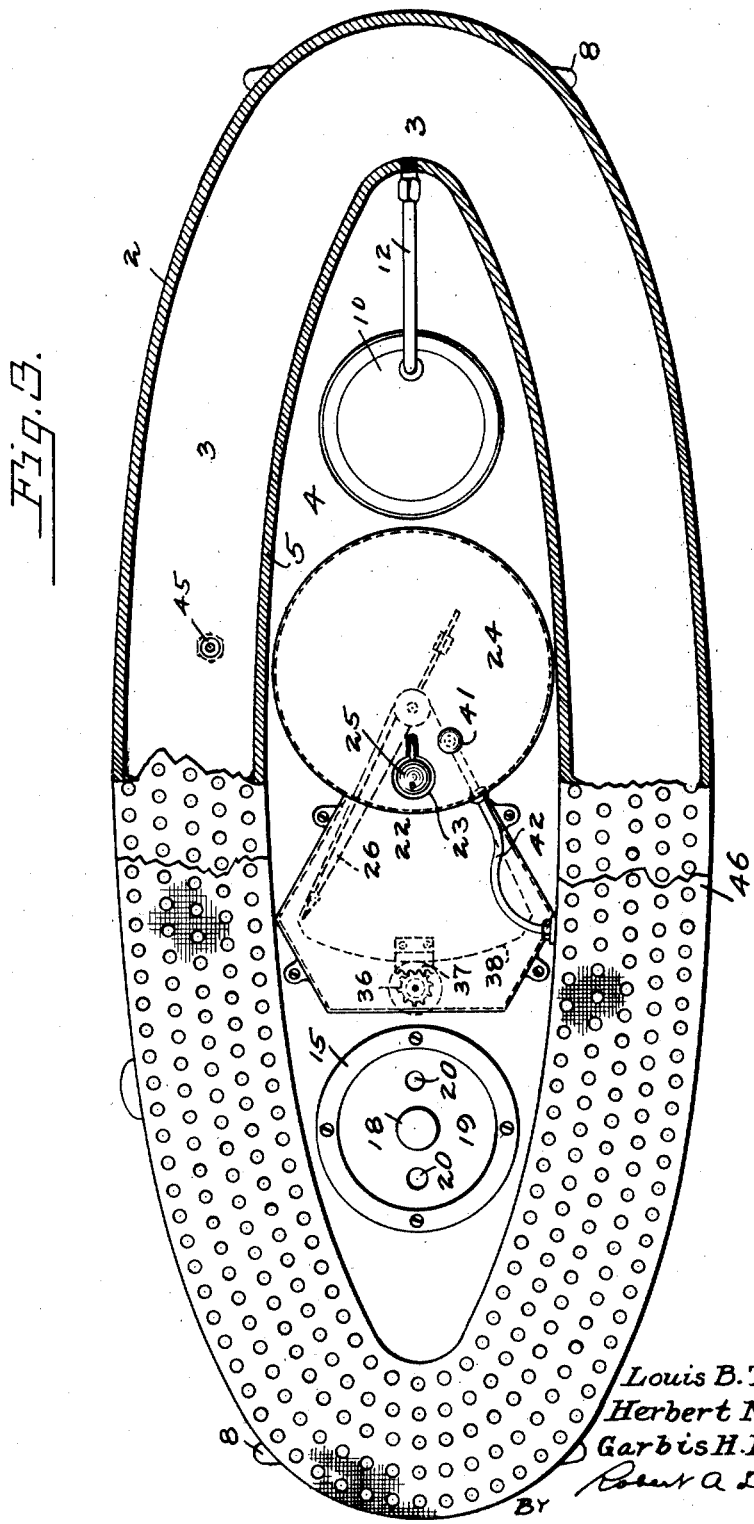

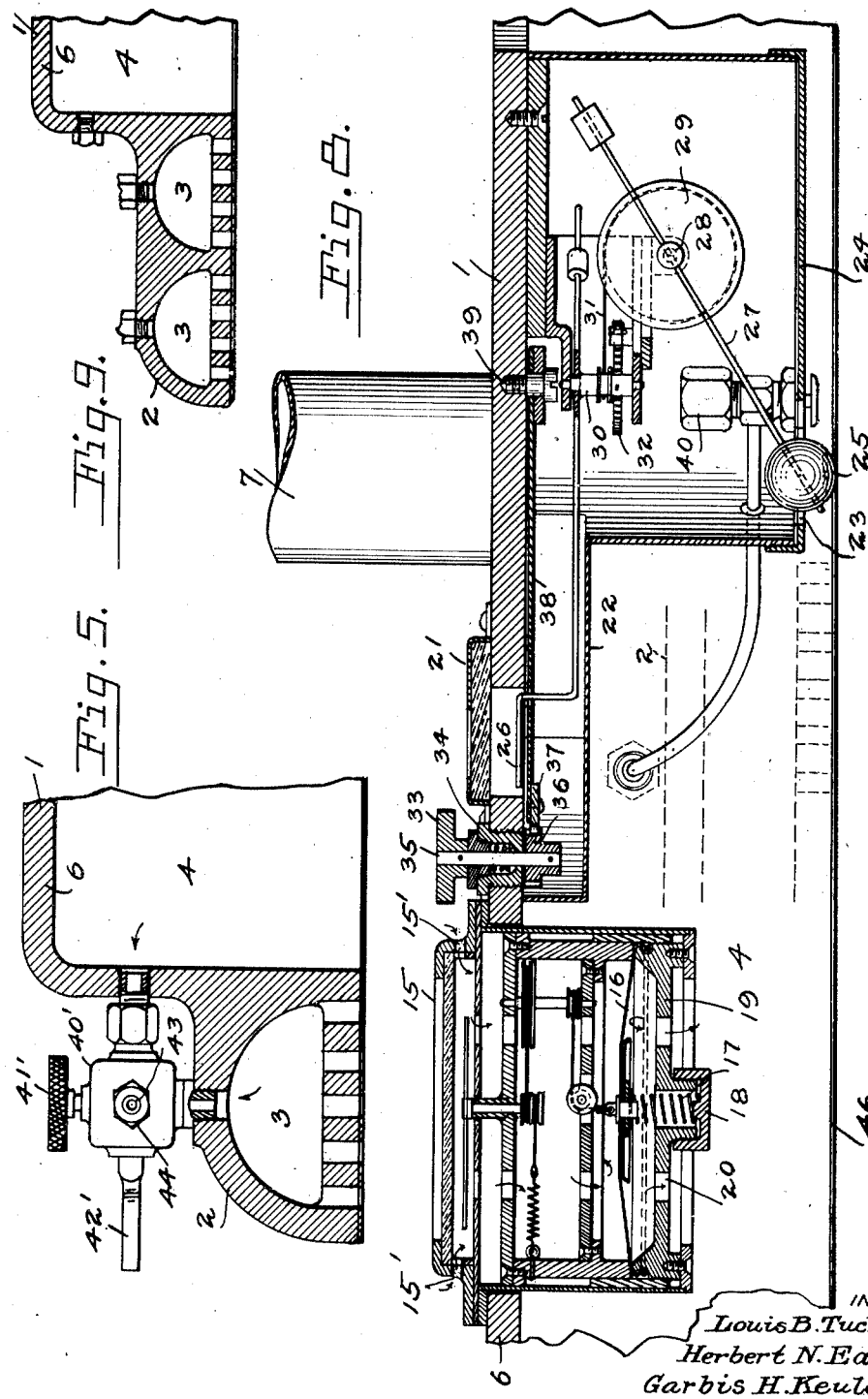

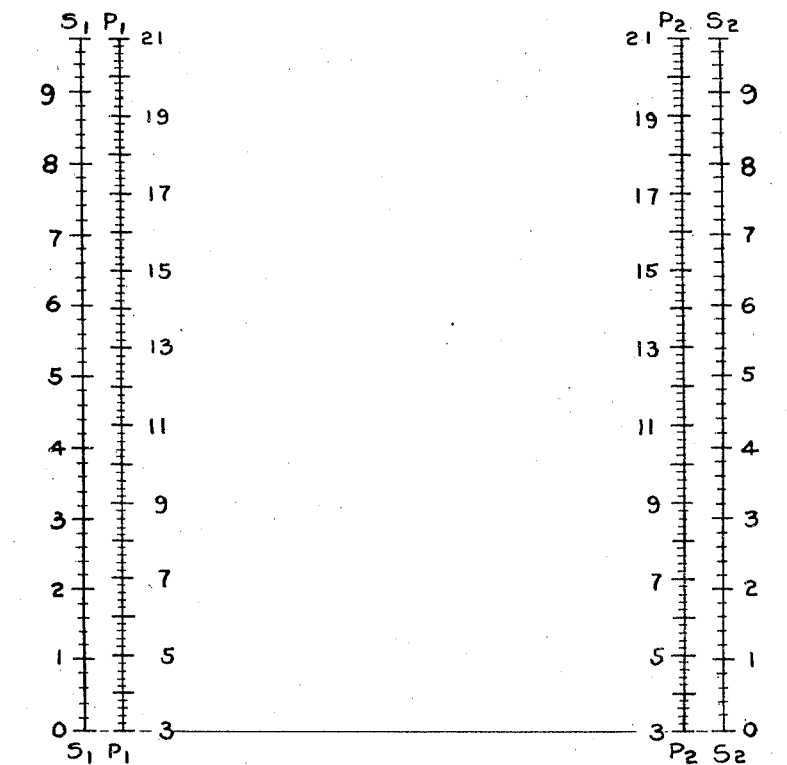

1,723,636

UNITED STATES PATENT OFFICE.

LOUIS B. TUCKERMAN, OF WASHINGTON, DISTRICT OF COLUMBIA, HERBERT N. EATON, OF NEW YORK, N. Y., AND GARBIS H. KEULEGAN, OF WASHINGTON, DISTRICT OF COLUMBIA.

MEASURING INSTRUMENT.

Application filed October 19, 1926. Serial No. 142,558.

Our invention relates broadly to measuring instruments and more particularly to tension meters for measuring the tension or modulus of elasticity in sheet materials forming the covering of rigid, semi-rigid, and non-rigid airships, balloons, balloonets or the covering of airplane wings.

For illustrative purposes we shall describe our invention as applied to sheet materials of the above nature, but it is to be understood that the device may be as successfully used in connection with other sheet materials, such as sheet steel and the like.

On rigid aircraft the covering is usually a doped, painted, or rubber-treated fabric made up of many strips cemented together and secured over the girders in large sections by lacing sections of the fabric together through suitable eyelets. It frequently occurs that the contraction of a section of fabric, due to the aging of the fabric or to changes in atmospheric temperature and humidity, increases the tension of the fabric to such an extent as to cause its failure, or the failure of the supporting frame, under other conditions the fabric may become sufficiently slack to produce objectionable flapping. Obviously an instrument of the character described hereinafter, that will measure the magnitude of the stresses at any point in a section of the fabric while it is in place on an aircraft, would be exceedingly useful. The present instrument, while suited for other testing purposes, is primarily designed for the determination of stress conditions in doped fabric on rigid aircraft.

The principal object of our invention is to provide a simple, practical, and efficient portable meter that will adhere by suction to a sheet material, such as doped cover fabric of aircraft and the like for the purpose of determining the stresses existing within this material.

Another object is to provide a device of the character described that may be placed on the outside of a fabric covering and that will adhere to such covering by suction, without having to prepare the inner surface or underside of the fabric in any manner.

With the above and other objects in view, our invention consists in the construction, combination and arrangement of parts as will be hereinafter more fully described.

Reference is to be had to the accompanying drawings forming a part of this specification in which like reference characters indicate corresponding parts throughout the several views and in which:

Figure 1 is a plan view of a device embodying the features of our invention,

Figure 2 is a central longitudinal section on the line 2—2 of Figure 4,

Figure 3 is a bottom plan view with parts in section,

Figure 4 is an end view,

Figure 5 is a detail of a suction control valve taken on the line 5—5 of Figure 1, Figure 6 is a diagrammatic view showing two positions of the instrument applied to a surface, Figure 7 is a detail view of a chart of nomogram used in computing stresses in a surface after readings have been taken from the gauges, Figure 8 is an enlarged detail section through the vacuum gauge, and Figure 9 is a modification showing a plurality of outer chambers.

Referring more particularly to the drawings, the body of the meter consists of an elliptical casting 1 provided with a hollow suction rim 2 extending around the circumference thus forming an outer suction chamber 3 and an inner chamber 4. The inner chamber is bounded by side walls 5 and top portion 6 in which are located the registering instruments. A large and preferably hollow handle 7 is secured on the top central portion of the casting 1 by bolts 7'. For convenience in handling and placing the instrument in position two smaller handles 8 are secured at the ends of the casting 1.

A vacuum gauge 10 for indicating the amount of suction in the outer chamber 3 is secured by screws 11 to part 6 and is connected by pipe 12 to suction chamber 3. A vacuum gauge 15, calibrated in inches head of water, is located in the part 6 to measure the suction in the chamber 4, and is of special design. A slack leather diaphragm pressure element 16 is arranged to be forced down under suction corresponding to that in the chamber 4. The gauge in the present instrument is so designed as to have an open scale for low suction values and closer graduations for higher suction values and to measure tensions from 0 to approximately 9 pounds per square inch. A helical spring 17 is used to restrain the motion of diaphragm 16. The tension of the spring 17 may be varied to adjust the zero reading of the gauge by means of a thumbscrew 18 located in the bottom 19 of the gauge.

Holes 20 in the bottom 19 of the gauge 15, permit the reduced pressure in the inner chamber 4 to enter the lower portion of the gauge 15 and act upon the diaphragm, while holes 15' are provided in the top to permit atmospheric pressure to enter the gauge above the diaphragm.

A deflection gauge 21, calibrated in fractions of an inch of deflection of the material under test, is located in the part 6 and is housed in a casing 22. A ball, 25, projecting through an aperture 23 in the bottom cover 24, is in contact with the material being tested and operates a pointer 26 through a chain of multiplying units. The ball is mounted on rod 27 that is mounted on shaft 28 and operates multiplying pulley 29, also secured to the shaft 28. The pulley 29 operates a stud shaft 30 by means of a metallic ribbon 31. A hair spring 32 is provided to return the pointer to zero and hold the ribbon 31 taut.

A thumb screw 33 is mounted in a bushing 34 in the top 6 of casing 1 for correcting the dial reading of the deflection gauge. The shaft 35 of the thumb screw 33 has secured thereto a pinion 36 that meshes with a rack 37 connected to the dial 38 and pivoted at 39 to the top 6.

When the sheet of fabric being tested deflects beyond a predetermined amount, the vacuum within the chamber 4 is relieved by a spring controlled safety valve 40 located in the bottom plate 24 of the deflection gauge 21, which permits air to enter the inner chamber from the outside through pipe 42 that has a suitable fitting tapped through the side wall 5. Thus, when the sheet being tested is deflated sufficiently to come in contact with the head of the plunger 41, the valve is opened to permit air to enter the chamber 4 and thus relieve the suction.

It is evident that, although in the instrument as described, a suction or vacuum is used to deflect the fabric, the deflection in the opposite direction produced by a pressure could also be used. The theory of such deflection would be the same in form as that given here. For this reason, the word pressure might be substituted for vacuum or suction throughout the description of the action of the inner chamber.

A spring controller relief valve 45 is also provided for relieving the suction in the outer chamber 3 to prevent the sheet under test from being drawn too far into the perforations or apertures in the bottom casing of the outer suction chamber 3.

A two-passage valve 40' is located on the outside of rim 2 for the purpose of controlling the suction line between chambers 3 and 4. A valve 41' controls the vacuum supply to the inner chamber 4, and valve 42' controls the suction supply to the outer chamber 3. A pipe 43, connected to the valve 40' by a coupling 44, is run from a suction pump (not shown).

To insure a more positive contact between the fabric being tested and the base of the instrument, a layer of fabric 46, provided with corresponding perforations to register with the drill holes in rim 2, is cemented to the base. The addition of the fabric to the base adds to the adhering qualities of the instrument. The provision of this fabric pad has proven to be successful, but conditions may be found to exist such as when operating on a covering that has become stiff from continued applications of dope, when further adhering qualities may be secured by the application of glycerine or vaseline to the fabric before attaching the instrument.

It may also be desirable under other conditions to provide additional outer suction chambers in which the suction may be separately controlled.

In reducing observation with our instrument to stress values use is made of the fundamental equation:

$$P = \frac{S_1}{R_1} + \frac{S_2}{R_2}$$

(See the National Advisory Committee Aeronautics Technical Report No. 16.) Where P is the differential hydrostatic pressure applied to deflect the fabric into the chamber, $S_1$ and $S_2$ are the tensions in the fabric per unit length in the direction of the minor and major axes respectively of the elliptical chamber, and $R_1$ and $R_2$ are the radii of curvature of the deflected portion of the fabric in the direction of the minor and major axes of the elliptical chamber.

When the tension meter is used on single ply fabric whose modulus of elasticity is known, it is merely necessary to take two readings at the given point on the fabric with the axes of the instrument turned in two different directions successively. The two readings thus obtained enable equation (1) to be solved for the tensions $S_1$ and $S_2$. The direction in which $S_1$ and $S_2$ are to be taken are known in the case of single ply fabric since these stresses must lie in the directions of the threads (warp and woof).

The method of procedure to be followed in taking the readings is: If necessary in order to obtain a sufficiently tight joint between the face of the instrument and the fabric, glycerine, vaseline, or some other suitable grease is spread over the area of the fabric to which the instrument is to be applied. Apply the instrument to the fabric with the minor axis in the direction of one set of threads, and adjust the pointer of the deflection gauge to zero, if necessary, by means of the adjusting screw. Open the rim valve applying the full vacuum to the rim chamber and thereby cause the instrument to adhere tightly to the fabric. Now open the chamber valve slowly, applying gradually increasing suction to the chamber, causing the fabric to deflect inward. Increase the suction in the chamber until the fabric has deflected 1/8 inch as indicated by the deflection gauge. By manipulating the chamber valve, hold the reading of the deflection gauge constant at 1/8 inch and read the chamber suction gauge. Record the reading of the suction gauge as $P_1$. Release the suction in both chamber and rim and rotate the instrument through an angle of 90° so that the minor axis of the elliptical chamber now lies in the direction of the other set of threads. Proceed exactly as described for the first position of the instrument and obtain a second reading $P_2$ of the suction gauge.

The two suction readings $P_1$ and $P_2$ are converted into the tensions $S_1$ and $S_2$ by means of an application of Equation (1) to the specific constants involved in the construction and use of the instrument or a chart or nomogram based on Equation (1). For the preparation of such a nomogram, Equation (1) is modified to include the construction constants of the instrument and to fit the two positions in which the instrument is applied:

$$P_1 = \frac{2Z_0}{A^2}(N^2 S_1 + S_2) \quad (2a)$$

for the first position of the instrument, and $$P_2 = \frac{2Z_0}{A^2}(S_1 + N^2 S_2) \quad (2b)$$

for the second position of the instrument.

Here $S_1$ and $S_2$ are not initial stresses in the fabric but include the slight increases $S'_1$ and $S'_2$ in these initial stresses due to the stretching of the fabric as it deflects into the chamber. If, from experience the modulus of elasticity of the fabric is known, the values $S'_1$ and $S'_2$ can be computed and the chart or nomogram prepared to eliminate them, as has been done in Figure 7.

Here $Z_0$ is the deflection of the fabric (1/8 inch in this case), A is half the length of the major axis of the elliptical chamber (8 inches in this case) B half the length of the minor axis and $N = A/B$, Equations (2a) and (2b) become respectively:

$$P_1 = 0.1082(S_2 + 16 S_1) \quad (3a)$$
$$P_2 = 0.1082(16 S_2 + S_1) \quad (3b)$$

Multiple ply fabric is made up of two or more layers of single ply fabric, the various layers being glued, cemented or otherwise attached to each other in such a manner that the threads of one layer make an angle of 45° with the corresponding threads of the other layers. The directions of the maximum and minimum stresses, $S_m$ and $S_n$ are not known in this case, but they are known to lie in directions 90° apart. Three (or preferably four) readings of the instrument are taken in this case, the minor axis being placed successively in positions 45° apart, the initial position being arbitrary, but preferably vertical. The procedure of obtaining the readings is exactly as in the first case. The four readings obtained are called $P_1$, $P_2$, $P_3$, and $P_4$.

The maximum and minimum stresses $S_m$ and $S_n$ lie in the directions $\Theta$ and $90° + \Theta$ with the first position of the major axis, $\Theta$, being as yet unknown. Equation (1) is now modified to fit this case, and yields the equation (see Bureau of Standards Technologic Paper No. 320, 1926):

$$S_m + S_n = K_1(P_1 + P_3) = K_1(P_2 + P_4) \quad (4a)$$
$$S_m - S_n = K_2 \sqrt{(P_1 - P_3)^2 - (P_4 P_2)^2} \quad (4b)$$

and $$\tan 2\Theta = \frac{P_4 - P_2}{P_1 - P_3}$$

where $$K_1 = \frac{A^2}{2Z_0(N^2 + 1)}$$

and $$K_2 = \frac{A^2}{2Z_0(N^2 - 1)} \quad (4c)$$

from which $S_m$, $S_n$ and $\Theta$ can be computed.

In deriving the Equations (2a), (2b), (3a), (3b), (4a), (4b) and (4c) it is necessary to know the modulus of elasticity of the fabric. In case the modulus is not known, however, it is still possible to determine the stresses by a slightly different procedure.

If instead of taking a single reading of the suction gauge, two readings are taken for a fabric deflection $Z_0$ and $\sqrt{2}Z_0$, the correct values of $S_1$ and $S_2$, or $S_m$ and $S_n$, as the case may be, may be obtained without knowledge of the modulus of elasticity of the fabric. For this purpose Equations (2a) and (2b) for $S_1$ and $S_2$ are modified to:

$$S_1 = \frac{2\left[\frac{A^2}{2Z_0}(N^2 P_1 - P_2)\right]}{N^4 - 1} - \frac{\left[\frac{A^2}{2\sqrt{2}Z_0}(N^2 P_4' - P_2')\right]}{N^4 - 1} \quad (5a)$$

and $$S_2 = \frac{2\left[\frac{A^2}{2Z_0}N^2 P_2 - P_1)\right]}{N^4 - 1} - \frac{\left[\frac{A^2}{2\sqrt{2}Z_0}(N^2 P_2' - P_1')\right]}{N^4 - 1} \quad (5b)$$

Where $P_1$ and $P_2$ have the same significance as in the first case and are for a deflection of $Z_0$, and $P_1'$ and $P_2'$ are for the additional readings in the same positions respectively as $P_1$ and $P_2$ and are for deflections of $\sqrt{2Z_0}$.

Equations (5a) and (5b) may be simplified still further by having two concentric scales on the suction gauge, having corresponding graduations spaced in the proportion of $1:\sqrt{2}$, $P_1$ and $P_2$ to be read from the second scale and $P_1'$ and $P_2'$ from the first scale. The solving of these equations can also be simplified by the use of nomograms.

In the operation of the meter it is necessary to take two readings at right angles, and at the same location, on the outside of the cover-forming doped fabric, and with readings derived from the gauges, and use of a conversion chart, computed by formulæ, or by the formulæ themselves, existing stresses become known.

It is evident that this process may be used not only to determine the tension of sheet fabric, but also to determine the modulus of elasticity of other materials, such as sheet rubber, steel and the like.

It will be understood that the above description and accompanying drawings comprehend only the general and preferred embodiment of our invention and that minor changes in details of construction and arrangement of parts may be made without changing the scope of the appended claims and without sacrificing any of the advantages of our invention.

Having described our invention we claim:

1. A measuring instrument including an outer vacuum chamber, means for controlling the suction thereof, an inner vacuum chamber, means for controlling the suction thereof, and registering means connected with each of said chambers for indicating the amount of suction therein.

2. A measuring instrument including an outer vacuum chamber, means for controlling the suction thereof, an inner pressure chamber, means for controlling the pressure thereof, and registering means connected with each of said chambers for indicating the amount of suction and pressure therein respectively.

3. A measuring instrument including an elongated inner vacuum chamber, suction apparatus associated therewith, means for controlling the suction thereof, an outer suction chamber peripherally surrounding the first said chamber, suction apparatus associated therewith, means for controlling the suction thereof, and registering means connected with each of said chambers for indicating the amount of suction therein.

4. A measuring instrument including a plurality of suction chambers, one being arranged peripherally about the other, registering means associated with each of said chambers for indicating the amount of suction therein, a plurality of apertures in the outer casing of said chambers, and means for controlling the suction of said chambers.

5. A measuring instrument, a plurality of suction chambers, one being arranged peripherally about the other, registering means associated with each of said chambers for indicating the amount of suction therein, means for controlling the suction of the chambers, and an adhesive means for causing the measuring instrument to adhere to a surface under tension.

6. A measuring instrument including an inner suction chamber, a suction registering means associated therewith, an outer suction chamber, suction registering means associated therewith, means for controlling the suction of said chambers, and means associated with the inner chambers for determining the amount of deflection in a material to which the measuring instrument is applied.

7. In a device for measuring the deflection of sheet materials under tension, a plurality of suction chambers, means for registering the amount of suction therein, means for controlling the amount of suction, and means for measuring deflection in said sheet materials, said means consisting of a gauge, a train of gears, and a weighted arm extending slightly below the face of one of said chambers for controlling the gauge through said gears.

8. In a device for measuring deflection in a material under tension, a plurality of suction chambers, a means connected to one of said chambers, for registering the amount of suction, and means connected to another of the chambers to register the amount of deflection, whence the initial stresses of the material may be calculated.

9. A method of determining stresses in a material under tension consisting in causing a deflection in said material by a definite amount of suction, observing the amount of deflection, and computing the stresses from the observed deflection and known suction.

10. A method of determining stresses in a material under tension consisting in causing a deflection of the material by suction, observing the amount of deflection in terms of inches of deflection, observing the amount of suction to produce said deflection, and translating the observations in terms of pounds per inch by calculation and tables.

L. B. TUCKERMAN.
H. N. EATON.
G. H. KEULEGAN.